US010114253B2

(12) United States Patent
Kwon et al.

(10) Patent No.: US 10,114,253 B2
(45) Date of Patent: Oct. 30, 2018

(54) DISPLAY PANEL AND METHOD FOR MANUFACTURING THE SAME, DISPLAY DEVICE AND METHOD FOR MANUFACTURING THE SAME, AND SUBSTRATE CURVING DEVICE

(71) Applicants: BOE TECHNOLOGY GROUP CO., LTD., Beijing (CN); HEFEI BOE OPTOELECTRONICS TECHNOLOGY CO., LTD., Anhui (CN)

(72) Inventors: Youngman Kwon, Beijing (CN); Kuhyun Park, Beijing (CN); Yunbok Lee, Beijing (CN); Dongling Sun, Beijing (CN); Zhengwei Zhu, Beijing (CN); Wenhao Zhang, Beijing (CN); Sheng Wang, Beijing (CN)

(73) Assignees: BOE TECHNOLOGY GROUP CO., LTD. (CN); HEFEI BOE OPTOELECTRONICS TECHNOLOGY CO., LTD. (CN)

( * ) Notice: Subject to any disclaimer, the term of this patent is extended or adjusted under 35 U.S.C. 154(b) by 56 days.

(21) Appl. No.: 15/235,500

(22) Filed: Aug. 12, 2016

(65) Prior Publication Data
US 2017/0192297 A1 Jul. 6, 2017

(30) Foreign Application Priority Data
Jan. 4, 2016 (CN) .......................... 2016 1 0003655

(51) Int. Cl.
G02F 1/1335 (2006.01)
G02F 1/1341 (2006.01)
G02F 1/1333 (2006.01)

(52) U.S. Cl.
CPC .......... *G02F 1/1341* (2013.01); *G02F 1/1333* (2013.01); *G02F 2001/13415* (2013.01)

(58) Field of Classification Search
CPC .................................. G02F 1/133514
See application file for complete search history.

(56) References Cited

U.S. PATENT DOCUMENTS

2002/0060765 A1* 5/2002 Hattori .................. G02F 1/1395
349/134
2006/0158601 A1* 7/2006 Lee ........................ C03B 33/033
349/156

(Continued)

FOREIGN PATENT DOCUMENTS

| CN | 103984140 A | 8/2014 |
| CN | 104155797 A | 11/2014 |
| CN | 204189829 U | 3/2015 |

OTHER PUBLICATIONS

First Office Action for Chinese Application No. 201610003655.3, dated Apr. 2, 2018, 7 Pages.

*Primary Examiner* — Sang V Nguyen
(74) *Attorney, Agent, or Firm* — Brooks Kushman P.C.

(57) ABSTRACT

The present disclosure provides a display panel, a display device, their manufacturing methods, and a substrate curving device. The method for manufacturing the display panel includes steps of: providing two substrates for forming the display panel; arranging the two substrates opposite to each other, curving the two substrates at a predetermined curvature, and directly dripping liquid crystals into a space between the two curved substrates, so as to make the liquid crystals to have a twist angle matching with the predetermined curvature of the two curved substrates; and after the dripping, arranging the two substrates opposite to each other to form a cell. According to the present disclosure, the liquid crystals are dripped into between the two curved substrates, (Continued)

the then the two curved substrates are arranged opposite to each other to form the display panel.

10 Claims, 3 Drawing Sheets

(56) References Cited

U.S. PATENT DOCUMENTS

| | | | | |
|---|---|---|---|---|
| 2010/0253902 | A1* | 10/2010 | Yamazaki | G02F 1/1303 349/158 |
| 2012/0020056 | A1* | 1/2012 | Yamagata | G02F 1/133308 362/97.1 |
| 2015/0370116 | A1* | 12/2015 | Chae | G02F 1/13394 349/43 |
| 2016/0097954 | A1* | 4/2016 | Lee | G02F 1/133788 349/124 |
| 2016/0116774 | A1* | 4/2016 | Ma | G02F 1/1341 156/250 |
| 2016/0161549 | A1* | 6/2016 | Wang | G02F 1/1362 324/750.01 |
| 2017/0331076 | A1* | 11/2017 | Misono | H01L 51/56 |
| 2018/0026212 | A1* | 1/2018 | Hasegawa | H01L 51/0097 |

* cited by examiner ing the two curved substrates opposite to each other to form a cell, and performing panel treatment processes to the flatted display panel, where the panel treatment processes comprise a testing of the flatted display panel; and after the panel treatment processes, curving flatted the display panel to the predetermined curvature.

Optionally, the two substrates include an array substrate and a color filter substrate.

In another aspect, the present disclosure provides in some embodiments a method for manufacturing a display device, including steps of: providing two substrates for forming a display panel; arranging the two substrates opposite to each other, curving the two substrates at a predetermined curvature, and directly dripping liquid crystals into a space between the two curved substrates, so as to make the liquid crystals to have a twist angle matching with the predetermined curvature of the two curved substrates; after the dripping, arranging the two curved substrates opposite to each other to form a cell; after the two substrates have been arranged opposite to each other to form a cell, flatting the resultant display panel formed by arranging the two curved substrates opposite to each other to form a cell, and performing panel treatment processes to the flatted display panel, where the panel treatment processes comprise a testing of the flatted display panel; after the panel treatment processes, curving the flatted display panel to the predetermined curvature; and attaching a backlight module to the curved display panel in the curved state.

Optionally, in the case of arranging the two substrates opposite to each other to form a cell, the two curved substrates are of the predetermined curvature.

Optionally, the two substrates include an array substrate and a color filter substrate.

In yet another aspect, the present disclosure provides in some embodiments a display panel manufactured by the above-mentioned method, including two substrates arranged opposite to each other to form a cell, and liquid crystals arranged between the two substrates. The two substrates are curved at a predetermined curvature, and when the display panel is powered off, the liquid crystals have a twist angle matching with the predetermined curvature of the two curved substrates.

Optionally, the two substrates include an array substrate and a color filter substrate.

In still yet another aspect, the present disclosure provides in some embodiments a display device manufactured by the above-mentioned method, including a display panel and a backlight module attached to the display panel. The display panel includes two substrates arranged opposite to each other to form a cell, and liquid crystals arranged between the two substrates. The two substrates are curved at a predetermined curvature, and when the display panel is powered off, the liquid crystals have a twist angle matching with the predetermined curvature of the two curved substrates.

In still yet another aspect, the present disclosure provides in some embodiments a substrate curving device for use in the above-mentioned methods, including a front-surface constraining plate for constraining a front surface of a substrate and lateral-surface constraining pins for constraining lateral surfaces of the substrate. The front-surface constraining plate includes a curved surface which has a predetermined curvature and which is in contact with the front surface of the substrate so as to fix the substrate thereon.

Optionally, the curved surface of the front-surface constraining plate is provided with a plurality of vacuum adsorption holes, a plurality of hollow rods in communication with the vacuum adsorption holes is arranged on the

DISPLAY PANEL AND METHOD FOR MANUFACTURING THE SAME, DISPLAY DEVICE AND METHOD FOR MANUFACTURING THE SAME, AND SUBSTRATE CURVING DEVICE

CROSS-REFERENCE TO RELATED APPLICATIONS

This application claims priority to Chinese application No. 201610003655.3, filed Jan. 4, 2016, which is hereby incorporated by reference in its entirety.

TECHNICAL FIELD

The present disclosure relates to the field of liquid crystal display technology, in particular to a display device and a method for manufacturing the same, a display device and a method for manufacturing the same, and a substrate curving device.

BACKGROUND

Recently, a curved display panel has been applied to televisions so as to prevent the occurrence of a distorted or dazzling image. In addition, the curved display panel has also been applied to mobile phones, so as to provide various designs and facilitate the handholding thereof, thereby to improve the user experience.

In the related art, the curved display panel is mainly applied to an Active Matrix Organic Light-emitting Diode (AMOLED) or Polymer Organic Light-Emitting Diode (POLED) display device. When the curved display panel is applied to a Thin Film Transistor-Liquid Crystal Display (TFT-LCD), usually a flat-panel liquid crystal display panel is curved directly. For the liquid crystal display panel with an In-Plane Switch (IPS) mode, twist angles of liquid crystals inside the curved display panel may be changed more significantly at a position closer to an edge of the display panel. At this time, very serious L0 light leakage may occur, so a normal display operation will be adversely affected.

SUMMARY

An object of the present disclosure is to provide a display panel, a display device, their manufacturing methods, and a substrate curving device, so as to achieve the curved-surface display by the TFT-LCD display panel while ensuring the image quality.

In one aspect, the present disclosure provides in some embodiments a method for manufacturing a display panel, including steps of: providing two substrates for forming the display panel; arranging the two substrates opposite to each other, curving the two substrates at a predetermined curvature, and directly dripping liquid crystals into a space between the two curved substrates, so as to make the liquid crystals to have a twist angle matching with the predetermined curvature of the two curved substrates; and after the dripping, arranging the two curved substrates opposite to each other to form a cell.

Optionally, when the two curved substrates are arranged opposite to each other to form a cell, the two curved substrates are of the predetermined curvature.

Optionally, the method further includes: after the two substrates have been arranged opposite to each other to form a cell, flatting the resultant display panel formed by arrangfront-surface constraining plate, and each hollow rod is capable of being changed between a vacuumized state where the substrate is constrained onto the front-surface constraining plate so as to curve the substrate at the predetermined curvature, and an inflated state where the substrate is separated from the front-surface constraining plate so as to enable the substrate to be in a flat state.

According to the embodiments of the present disclosure, the liquid crystals are dripped into between the two curved substrates, and then the two curved substrates are arranged opposite to each other to form a cell. As compared with the related art where the liquid crystals are dripped into between the two flat substrates and then the two flat substrates are arranged opposite to each other form a cell, it is able to prevent twist angles of the liquid crystals inside the display panel from being changed and prevent the occurrence of L0 light leakage, thereby to achieve the curved-surface display while ensuring the image quality.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

In the related art, very serious L0 light leakage may occur for a TFT-LCD display panel in the case of the curved-surface display. In order to solve this defect, the present disclosure provides in some embodiments a method for manufacturing a display panel, so as to achieve the curved-surface display by the TFT-LCD display panel while ensuring the image quality.

Figure 1:
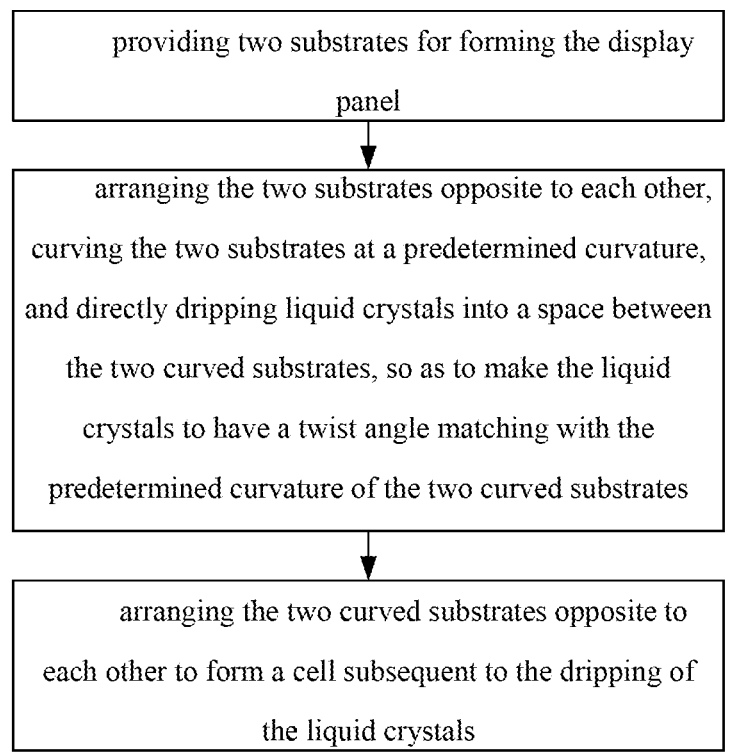
FIG. 1 is a flow chart of a method for manufacturing a display panel in some embodiments of the present disclosure.

As shown in FIG. 1, the method for manufacturing the display panel includes steps of: providing two substrates for forming the display panel; arranging the two substrates opposite to each other, curving the two substrates at a predetermined curvature, and directly dripping liquid crystals into a space between the two curved substrates, so as to make the liquid crystals to have a twist angle matching with the predetermined curvature of the two curved substrates; and after the dripping, arranging the two curved substrates opposite to each other to form a cell.

According to the embodiments of the present disclosure, in a One-Drop Filling (ODF) processing, the liquid crystals are dripped into a space between the two substrates (e.g., an array substrate and a color filter substrate) curved at the predetermined curvature, and after the dripping, the two curved substrates are arranged opposite to each other to form a cell. After a sealant is cured, the twist angle of the liquid crystals inside the display panel may not be changed when the display panel is curved at the predetermined curvature. After the ODF process, the display panel may be in a flat state for the subsequent processes. When a backlight module is attached to the resultant display panel to form a curved-surface display device, a curvature of the display panel may be identical to the predetermined curvature. Because the twist angle of the liquid crystals inside the display panel at the predetermined curvature is not changed, i.e., the twist angle is in a stable state, no L0 light leakage may occur.

In the embodiments of the present disclosure, the two substrates are still in a curved state when they are arranged opposite to each other to form a cell.

In addition, the method further includes: after the two substrates have been arranged opposite to each other to form a cell, flatting the resultant display panel, and performing panel treatment processes to the flatted display panel, where the panel treatment processes comprise a testing of the flatted display panel; and after the panel treatment processes, curving the flatted display panel to the predetermined curvature.

Subsequent to the ODF process and the cell formation process and prior to the attachment of the backlight module to the display panel, the flatter the display panel, the less possible the other defects. Hence, in some embodiments of the present disclosure, the subsequent panel treatment processes may be performed after the display panel has been in the flat state.

In addition, the display panel may be a TFT-LCD display panel, and the two substrates may be an array substrate and a color filter substrate.

The present disclosure further provides in some embodiments a method for manufacturing a display device including the above-mentioned display panel.

Figure 2:
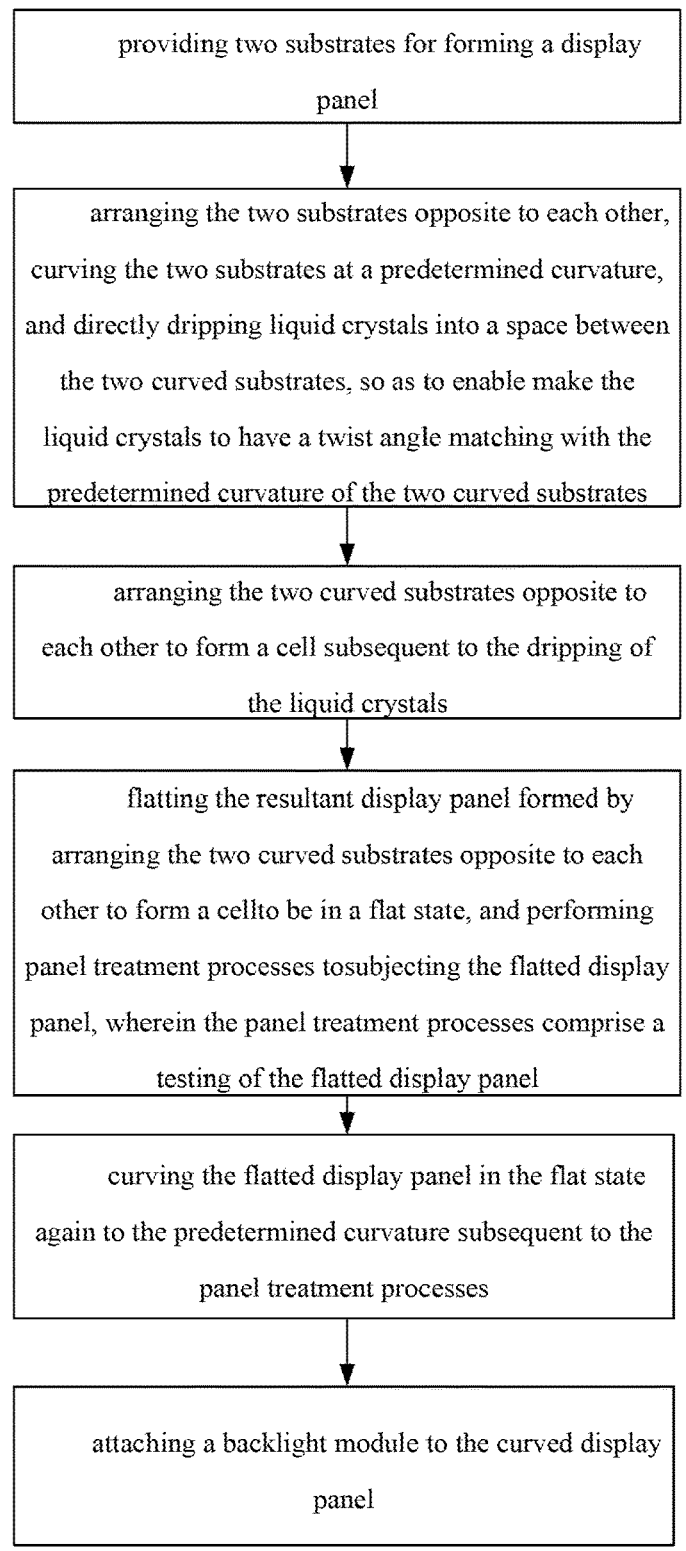
FIG. 2 is a flow chart of a method for manufacturing a display device in some embodiments of the present disclosure.

To be specific, as shown in FIG. 2, the method for manufacturing the display device includes steps of: providing the two substrates for forming the display panel; arranging the two substrates opposite to each other, curving the two substrates at the predetermined curvature, and directly dripping liquid crystals into a space between the two curved substrates, so as to make the liquid crystals to have a twist angle matching with the predetermined curvature of the two curved substrates; after the dripping, arranging the two curved substrates opposite to each other to form a cell; after the two substrates have been arranged opposite to each other to form a cell, flatting the resultant display panel formed by arranging the two curved substrates opposite to each other to form a cell, and performing panel treatment processes to the flatted display panel, where the panel treatment processes comprise a testing of the flatted display panel; after the panel treatment processes, curving the flatted display panel to the predetermined curvature subsequent to the panel treatment processes; and attaching a backlight module to the curved display panel.

According to the embodiments of the present disclosure, in an ODF processing, the liquid crystals are dripped into a space between the two substrates (e.g., an array substrate and a color filter substrate) curved at the predetermined curvature, and after the dripping, the two curved substrates are arranged opposite to each other to form a cell. After a sealant is cured, the twist angle of the liquid crystals inside the display panel may not be changed when the display panel is curved at the predetermined curvature. After the ODF process, the display panel may be in a flat state for the subsequent processes. When the backlight module is attached to the resultant display panel to form a curved-surface display device, a curvature of the display panel may be identical to the predetermined curvature. Because the twist angle of the liquid crystals inside the display panel at the predetermined curvature is not changed, i.e., the twist angle is in a stable state, no L0 light leakage may occur.

According to the method for manufacturing the display device in the embodiments of the present disclosure, the two substrates are still in the curved state when they are arranged opposite to each other to form a cell. In addition, subsequent to the ODF process and the cell formation process and prior to the attachment of the backlight module to the display panel, the flatter the display panel, the less possible the other defects. Hence, in the embodiments of the present disclosure, the subsequent panel treatment processes may be performed after the display panel has been in the flat state.

In addition, the display panel may be a TFT-LCD display panel, and the two substrates may be an array substrate and a color filter substrate.

The present disclosure further provides in some embodiments a display panel manufactured by the above-mentioned method. The display panel includes two substrates arranged opposite to each other to form a cell, and liquid crystals arranged between the two substrates. The two substrates are curved at a predetermined curvature, and when the display panel is powered off, the liquid crystals have a twist angle matching the predetermined curvature of the two curved substrates.

In the embodiments of the present disclosure, the display panel may be a TFT-LCD display panel, and the two substrates may be an array substrate and a color filter substrate.

Figure 4:
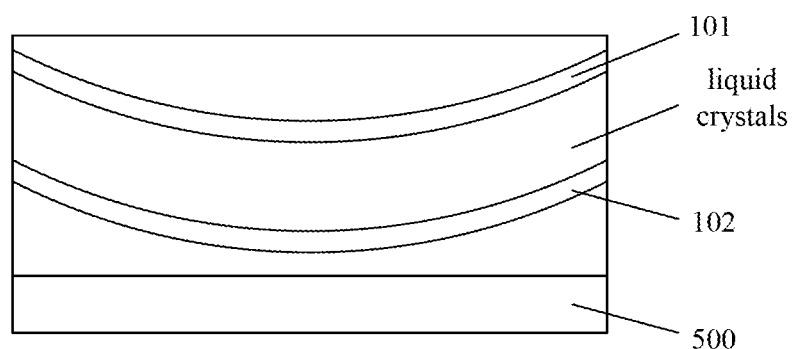
FIG. 4 is a schematic view showing the display device in some embodiments of the present disclosure.

The present disclosure further provides in some embodiments a display device manufactured by the above-mentioned method. As shown in FIG. 4, the display device includes a display panel and a backlight module 500 attached to the display panel. The display panel includes two substrates 101, 102 arranged opposite to each other to form a cell, and liquid crystals arranged between the two substrates. The two substrates are curved at a predetermined curvature, and when the display panel is powered off, the liquid crystals have a twist angle matching the predetermined curvature of the two curved substrates.

Figure 3:
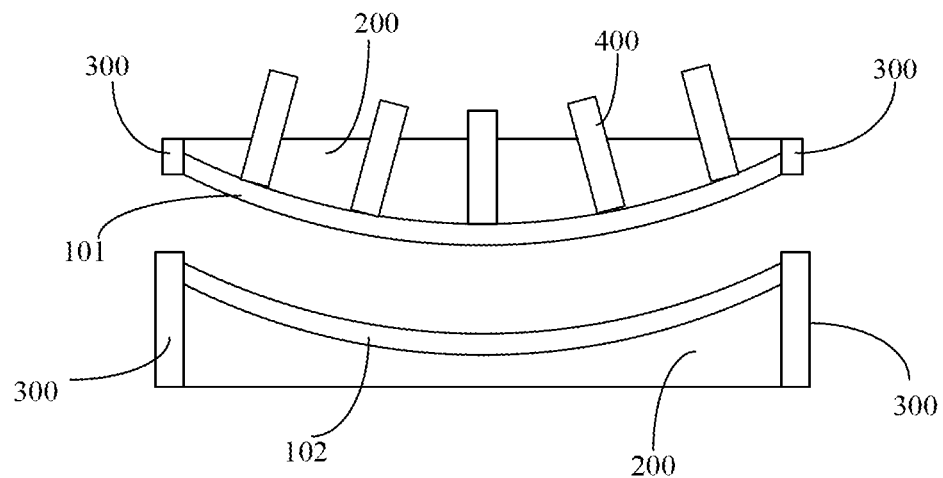
FIG. 3 is a schematic view showing a substrate curving device in some embodiments of the present disclosure.

The present disclosure further provides in some embodiments a substrate curving device for use in the above-mentioned methods. As shown in FIG. 3, the substrate curving device includes a front-surface constraining plate 200 for constraining a front surface of a substrate 100 and lateral-surface constraining pins 300 for constraining lateral surfaces of the substrate 100. The front-surface constraining plate 200 includes a curved surface which has a predetermined curvature and which is in contact with the front surface of the substrate 100 so as to fix the substrate thereon.

According to the substrate curving device in the embodiments of the present disclosure, the curved surface of the front-surface constraining plate 200 is provided with the predetermined curvature, and the front surfaces of the two substrates 101, 102 may each be in contact with, and fixed to, the corresponding curved surface of the front-surface constraining plate 200, and the lateral surfaces of each of the substrates 101, 102 may be constrained by the lateral-surface constraining pins 300. Due to the front-surface constraining plate 200 and the lateral-surface constraining pins 300, it is able to curve the substrates 101, 102 at the predetermined curvature.

In the embodiments of the present disclosure, the curved surface of the front-surface constraining plate 200 is provided with a plurality of vacuum adsorption holes, a plurality of hollow rods 400 in communication with the vacuum adsorption holes is arranged on the front-surface constraining plate 200, and each hollow rod 400 is capable of being changed between a vacuumized state where the substrates 101, 102 are each constrained onto the corresponding front-surface constraining plate 200 so as to curve the substrates 101, 102 at the predetermined curvature, and an inflated state where the substrates 101, 102 are each separated from the corresponding front-surface constraining plate 200 so as to enable the substrates 101, 102 to be in a flat state.

According to the embodiments of the present disclosure, the substrate 100 may be adsorbed onto the front-surface constraining plate 200 by vacuumizing a space in the hollow rod 400, and it may be separated from the front-surface constraining plate 200 by inflating the space in the hollow rod 400 so as to enable the substrate 100 to be in the flat state. The substrate curving device is of a smart design and may be operated easily, without damaging the substrate. It should be appreciated that, the substrate may also be fixed onto the front-surface constraining plate 200 in any other ways, which are not particularly defined herein.

The above are merely preferred embodiments of the present disclosure. It should be appreciated that, a person skilled in the art may make further modifications and improvements without departing from the principle of the present disclosure, and these modifications and improvements shall also fall within the scope of the present disclosure.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for manufacturing a display panel, comprising steps of:
   providing two substrates for forming the display panel;

arranging the two substrates opposite to each other, curving, by a substrate curving device, the two substrates at a predetermined curvature, and directly dripping liquid crystals into a space between the two curved substrates;

arranging the two curved substrates opposite to each other to form a cell subsequent to the dripping of the liquid crystals;

flatting, by the substrate curving device, the resultant display panel formed by arranging the two curved substrates opposite to each other to form a cell, and performing panel treatment processes to the flatted display panel, wherein the panel treatment processes comprise a testing of the flatted display panel; and curving, by the substrate curving device, the flatted display panel to the predetermined curvature subsequent to the panel treatment processes;

wherein the substrate curving device comprises: a front-surface constraining plate configured to constrain a front surface of a substrate and lateral-surface constraining pins configured to constrain lateral surfaces of the substrate, wherein the front-surface constraining plate comprises a curved surface which has a predetermined curvature and which is in contact with the front surface of the substrate so as to fix the substrate thereon;

wherein the curved surface of the front-surface constraining plate is provided with a plurality of vacuum adsorption holes, a plurality of hollow rods in communication with the vacuum adsorption holes is arranged on the front-surface constraining plate, and each hollow rod is capable of being changed between a vacuumized state where the substrate is constrained onto the front-surface constraining plate so as to curve the substrate at the predetermined curvature, and an inflated state where the substrate is separated from the front-surface constraining plate so as to enable the substrate to be in a flat state.

2. The method according to claim 1, wherein the two curved substrates are of the predetermined curvature when the two curved substrates are arranged opposite to each other to form a cell.

3. The method according to claim 1, wherein the two substrates comprise an array substrate and a color filter substrate.

4. A method for manufacturing a display device, comprising steps of:

providing two substrates for forming a display panel;

arranging the two substrates opposite to each other, curving, by a substrate curving device, the two substrates at a predetermined curvature, and directly dripping liquid crystals into a space between the two curved substrates;

arranging the two curved substrates opposite to each other to form a cell subsequent to the dripping of the liquid crystals;

flatting, by the substrate curving device, the resultant display panel formed by arranging the two curved substrates opposite to each other to form a cell, and performing panel treatment processes to the flatted display panel, wherein the panel treatment processes comprise a testing of the flatted display panel;

curving, by the substrate curving device, the flatted display panel to the predetermined curvature subsequent to the panel treatment processes; and attaching a backlight module to the curved display panel;

wherein the substrate curving device comprises: a front-surface constraining plate configured to constrain a front surface of a substrate and lateral-surface constraining pins configured to constrain lateral surfaces of the substrate, wherein the front-surface constraining plate comprises a curved surface which has a predetermined curvature and which is in contact with the front surface of the substrate so as to fix the substrate thereon;

wherein the curved surface of the front-surface constraining plate is provided with a plurality of vacuum adsorption holes, a plurality of hollow rods in communication with the vacuum adsorption holes is arranged on the front-surface constraining plate, and each hollow rod is capable of being changed between a vacuumized state where the substrate is constrained onto the front-surface constraining plate so as to curve the substrate at the predetermined curvature, and an inflated state where the substrate is separated from the front-surface constraining plate so as to enable the substrate to be in a flat state.

5. The method according to claim 4, wherein the two curved substrates are of the predetermined curvature when the two curved substrates are arranged opposite to each other to form a cell.

6. The method according to claim 4, wherein the two substrates comprise an array substrate and a color filter substrate.

7. A display panel manufactured by the method according to claim 1, comprising two substrates arranged opposite to each other to form a cell, and liquid crystals arranged between the two substrates, wherein the two substrates are curved at a predetermined curvature.

8. The display panel according to claim 7, wherein the two substrates comprise an array substrate and a color filter substrate.

9. A display device manufactured by the method according to claim 4, comprising a display panel and a backlight module attached to the display panel, wherein the display panel comprises two substrates arranged opposite to each other to form a cell, and liquid crystals arranged between the two substrates, the two substrates are curved at a predetermined curvature.

10. The display device according to claim 9, wherein the two substrates comprise an array substrate and a color filter substrate.

* * * * *